US007402190B2

(12) United States Patent
Costa et al.

(10) Patent No.: US 7,402,190 B2
(45) Date of Patent: Jul. 22, 2008

(54) METHOD FOR MAKING FORMULATED NITROGENOUS AND COMPLEX FERTILIZER IN HIGHLY HOMOGENIZED SPHERICAL GRANULE FORM STARTING FROM UREA-FORMALDEHYDE LIQUID RESINS AND THE FERTILIZER MADE THEREBY

(76) Inventors: Giancarlo Costa, Via Repubblica, 31, 26040 Gussola-Cremona (IT); Giuseppe Rizzi, Vicolo Pernino, 29, 46019 Viadana-Mantova (IT)

( * ) Notice: Subject to any disclaimer, the term of this patent is extended or adjusted under 35 U.S.C. 154(b) by 198 days.

(21) Appl. No.: 10/229,782

(22) Filed: Aug. 28, 2002

(65) Prior Publication Data

US 2003/0154754 A1 Aug. 21, 2003

(30) Foreign Application Priority Data

Aug. 30, 2001 (IT) .......................... MI2001A1831

(51) Int. Cl.
*C05C 9/02* (2006.01)

(52) U.S. Cl. ....................... 71/28; 71/29; 71/30; 71/31; 71/32; 71/64.02; 71/64.11; 71/64.13

(58) Field of Classification Search ..................... 71/28, 71/31, 64.1, 64.11, 64.02, 29, 30, 32, 64.13
See application file for complete search history.

(56) References Cited

U.S. PATENT DOCUMENTS 3,130,038 A * 4/1964 Royle et al. .................... 71/29
3,214,259 A * 10/1965 Waters et al. .................. 71/29
3,942,970 A * 3/1976 O'Donnell ..................... 71/12
4,089,899 A * 5/1978 Greidinger et al. ............ 564/59
4,123,570 A * 10/1978 Van Hijfte et al. .......... 427/222
4,304,588 A * 12/1981 Moore, Jr. ....................... 71/28
4,519,831 A * 5/1985 Moore ........................... 71/13
4,610,715 A * 9/1986 Monaldi et al. ................ 71/28
6,048,378 A * 4/2000 Moore ....................... 71/64.01
6,254,655 B1 * 7/2001 Goertz .......................... 71/28

OTHER PUBLICATIONS

"Nutrients for Plants", @ www.Floridagardener.com, 2001.*
Vitosh, N-P-K Fertilizers, pp. 1-8, downloaded from http://www.msue.msu.edu/vanburen-896.htm., 1998.*
Mitchell, "Nutrient Content of Fertilizer Materials", http://www.aces.edu/pubs/docs/A/ANR-0174, 1999.*
Vitosh, N-P-K Fertilizers, pp. 1-8, 1998, downloaded from archived data @ http://www.canr.msu.edu/vanburen/e-896.htm., available on Jan. 2002.*
Vitosh, 'N-P-K Fertilizers', pp. 1-8, downloaded from http://www.canr.msu.edu/vanburen-896.htm, archived 2000.*
Zublena et al., 'Nutrient Content of Fertilizer & Organic Materials', http://www.soil.ncsu.edu/publications/Soilfacts/AG-439-18/, archived Jul. 2001.*
Zublena et al., "Nutrient Content of Fertilizer & Organic Materials", downloadwd from http://www.ncsu.edu/publications/Soilfacts/AG-439-18/, archived May 2001.*

* cited by examiner

*Primary Examiner*—C. Sayala
(74) *Attorney, Agent, or Firm*—James V. Costigan; Hedman & Costigan, P.C.

(57) ABSTRACT

The present invention relates to a method for making formulated nitrogenous and complex fertilizers, in granule form, suitable for slowly releasing nitrogen, comprising the steps of preparing an aqueous urea/formaldehyde dispersion with a molar ratio from 0.8:1 to 2:1, adding an aqueous catalyzer solution in a weight ratio from 0.1 to 4%, controlling the pH of the aqueous dispersion to hold it within a range from 4.0 to 7.0, and supplying the aqueous dispersion to a recirculating granulating device, as a growth seed.

11 Claims, 1 Drawing Sheet

Figure 1:
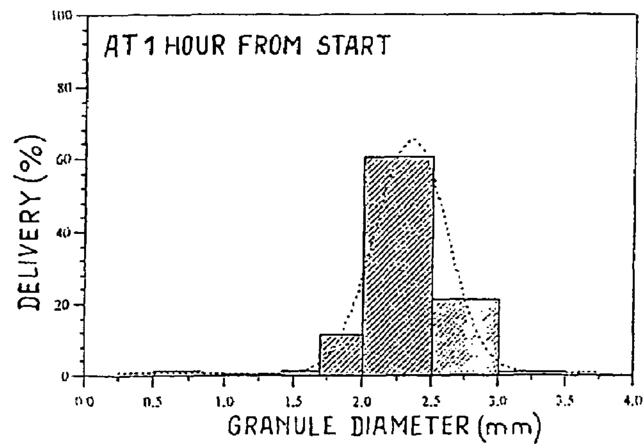

METHOD FOR MAKING FORMULATED NITROGENOUS AND COMPLEX FERTILIZER IN HIGHLY HOMOGENIZED SPHERICAL GRANULE FORM STARTING FROM UREA-FORMALDEHYDE LIQUID RESINS AND THE FERTILIZER MADE THEREBY

BACKGROUND OF THE INVENTION

The present invention relates to a method for making formulated fertilizers, optionally with microelements, in a spherical granule form having a high granulometric homogeneity, start from urea-formaldehyde resins in liquid form, and to the fertilizers made thereby.

Actually, also the fertilizers made by the inventive method constitute an integrating part of the invention.

As is known, urea-formaldehyde (UF) resins in solid form and of low molecular weight, are fertilizers adapted to slowly release nitrogen, both due to a high contents of said nitrogen (>36%), and to their capability of gradually continuously releasing nitrogen for a direct absorption by plants and the like.

This latter feature is a very important both from an economical and environmental standpoint.

Available fertilizers are compounds having a very high water solubility, and accordingly these compounds can be easily flushed or washed away by rain and irrigation waters.

In turn, this flushed away material can contaminate waters and ground water tables and moreover, since the flushed away material cannot aid the plant growth, it must be supplemented by new fertilizer compounds.

The efficiency of UF resins based nitrogenous fertilizers, including UF resins in solid form, is measured by the so-called "Activity Index" (AI) parameter, which is related to the respective amounts of hot water (HWIN) and cold water (CWIN) insoluble resins, and is bound to the nitrogen releasing rate as follows:

$$AI=100\cdot(1-HWIN/CWIN).$$

Small values of the above mentioned parameter AI are indicative of a slower releasing, whereas high values are indicative of a quicker releasing.

A standard nitrogenous fertilizer would have an AI value from 40% to 60%.

Prior urea-formaldehyde condensation products, containing low water solubility methylene-urea, have a nitrogen amount contents which can be released to plants within a long time period.

In turn, UF resins, used as a nitrogenous fertilizer, have a comparatively high value, both due to their high nitrogen contents, and their nitrogen releasing characteristics, both in cold and hot water.

The water soluble longer chains, on the other hand, can be hydrolized much more slowly than shorter chains.

The releasing efficiency abruptly decreases for oligomers including a urea amount larger than 5 units (tetramethylenepentaurea) and, at such an amount, they become nearly unattachable by the soil microorganisms.

Many commercially available fertilizers based on solid UF resins have a high hot water insolubility nitrogen rate, (HWIN), thereby this nitrogen, accordingly, would be practically unavailable for plants.

Thus, for reducing the hot water insoluble nitrogen amount, while holding the cold water insoluble fraction, thereof nearly unaltered, two methods have been conventionally used.

The first of these methods provides to add to the urea/formaldehyde mixture a further urea amount.

By this method, however, the excess free urea causes an increase of the fertilizer phytotoxicity.

The second method, in turn, provides to add ammonia in the form of ammonium salts in order to favour a formation of low molecular weight condensation products, in general not higher than trimers (dimethylenetriurea).

The condensation reaction of urea and formaldehyde is usually carried out by two stages:

1) in the first stage, urea and formaldehyde, in suitable ratios from 1.3 to 1.2 and at a pH from 7 to 10, are mixed at environment or room temperature, thereby favoring formation of methylolurea.
2) in the second stage, the mixture is acidified and heated (at a pH from 4.5 to 6.0 and at a temperature from 80 to 110° C.), thereby providing a UF resin.

The reaction can also be carried out in a single stage, by acidifying at low temperature (20÷40° C.) for a long time; however, such a method would provide a product very rich in free urea, with consequent phytotoxicity problems as the resin is used as a fertilizer.

An alternative method could comprise a use of an alcohol as a reaction solvent (either methyl or ethyl alcohol).

The urea-formaldehyde condensation reaction is always carried out by acidifying methylolurea formed in a basic environment or medium, the temperature being, in such a case, controlled by boiling the solvent off, since said solvent would operate as a thermal "flywheel".

More specifically, the condensing/drying reaction can be directly carried out in a granulating device, for example of a fluid bed type, or in a spraying-drying tower or column or, alternatively, in a CFSR (Continuous Flow Stirred Reactor) reactor, to exit therefrom as a suspension to be supplied to a turbo-dryer or other like apparatus.

Alternatively, the liquid form can be adsorbed on inert inorganic materials (vermiculite and clays in general).

For making fertilizers in grain form starting from a foamed resin, the condensing reaction is carried out by acidifying in the presence of surface active materials (0.05÷2%) and/or air in a reactor including a suitable stirring device.

SUMMARY OF THE INVENTION

The aim of the present invention is to improve the above disclosed results, by providing a method for making nitrogenous and complex fertilizers, designed for slowly releasing nitrogen, in granule form, thereby providing a product of high granulometric homogeneity and susceptible to be easily applied by conventional applying means for evenly distributing granular or granule form fertilizers.

In addition to nitrogen, the above mentioned products can also contain primary fertilizer elements (K, P), secondary fertilizer elements (Mg, Ca, S) and micro-elements (B, Fe, Zn, Mn, Cu, Mo).

Within the scope of the above mentioned aim, a main object of the present invention is to provide such a method allowing to easily and accurately control production parameters such as: catalyzer contents, drying air temperature, solid phase/liquid phase ratio inside the granulating device, as well as the holding time of the made compound in said granulating device.

A further object of the present invention is to provide such a method which is operatively very reliable and safe.

Yet another object of the present invention is to provide a method for making nitrogenous and complex fertilizers, for slowly releasing nitrogen, in granule form, which can be easily carried out by using easily commercially available elements and apparatus.

Yet another object of the present invention is to provide such a method which is very competitive from a mere economic standpoint.

According to one aspect of the present invention, the above mentioned aim and objects, as well as yet other objects, which will become more apparent hereinafter, are achieved by a method for making nitrogenous and complex fertilizers, for slowly releasing nitrogen, in granule form, characterized in that said method comprises the steps of preparing an aqueous urea-formaldehyde dispersion with a molar urea/formaldehyde ratio from 0.8:1 to 2:1, adding to said dispersion an aqueous catalyzer solution in a weight ratio from 0.1 to 4%, controlling a pH of said dispersion to hold said pH within a range from 4.0 to 7.0, and supplying the mixture to a granulating device, said granulating device including recycling means for recycling the product as a growth seed.

Further characteristics and advantages of the present invention will become more apparent hereinafter from the following detailed disclosure of a preferred, though not exclusive, embodiment of a method for making nitrogenous and complex fertilizers, for slowly releasing nitrogen, in granule form, which is illustrated, by way of a merely indicative but not limitative example, in the accompanying drawings.

More specifically, the method according to the present invention is generally based on a reactive drying, to be performed in a granulating device, of liquid form urea/formaldehyde resin, which sprayed on a solid support comprising uneven granules of small size, which granules can also be obtained by crushing a amount of finished product.

The liquid form urea/formaldehyde resin, in a ready for use condition, is stored in storing tanks near the processing system, likewise to the catalyzer tank.

From the storing tanks, the liquid resin is conveyed to a mixer, and then supplied to the granulator or granulating device.

In order to cause the granule-form urea/formaldehyde resin to solidify water contained in the liquid resin is evaporated off, and the polycondensation reaction is properly controlled.

In particular, the parameters controlling this process are: the catalyzer contents, drying air temperature, solid phase/liquid phase ratio and holding time in said granulating device.

The growth favoring seed is conveyed through the granulating device to be progressively enlarged size.

At the outlet of the granulating device, the granule compound is conveyed to a two net or mesh screen, where the granules are properly sieved out.

The first net of said granulating device is provided to remove the oversized product, which is crushed to provide a portion of the growth seed (to provide Applicant's fertilizer with a ureic nitrogen content less than 5% by weight, as it will be apparent from the enclosed Examples).

The second net separates the desired granulometry material from the finer material which is recirculated.

All of the powder loaded air from the system is collected and conveyed to a filter.

Figure 2:
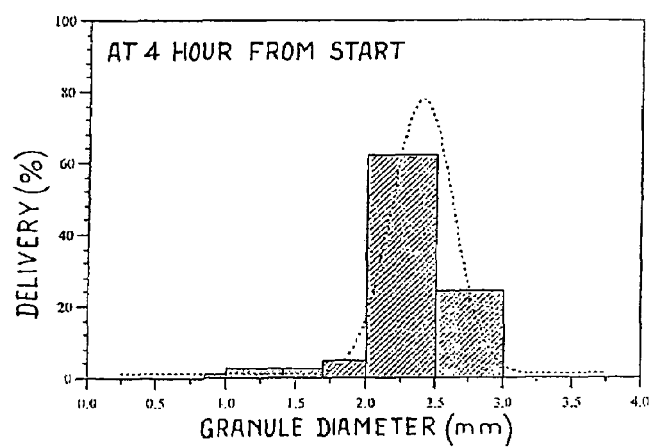
Figure 3:
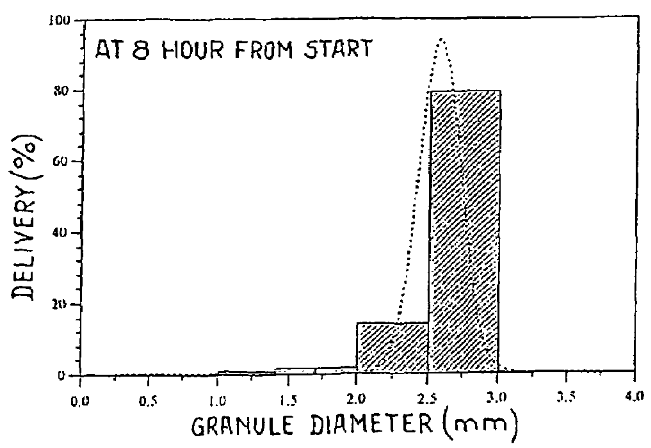

FIG. 1 to 3 illustrate hystrogram graphs or diagrams related to granulometry measurements carried out in typical granulating tests, with an extrapolation of a theoretical curve, obtained by using the Gauss' function.

An examination of the hystogram diagrams would allow to state that the granulating process herein claimed provides a very high granulometric homogeneity product, which can be accordingly easily applied by conventional application means as those used for distributing granule form fertilizers.

Agronomic Test

From a lot of practical actually performed test, it has been found that the made fertilizer is very useful because of its specifically designed structural and chemical properties.

The agronomic efficiency of the granule form UF fertilizer, has been evaluated by manuring tests on maize, using, in addition to the UF fertilizer, other 2 comparing fertilizers, i.e.: Urea and Floranid (based on IBDU).

The distributed nitrogen amounts were: 300 Kg/ha (which represents an optimum dose for maize), 225 Kg/ha (which represents an optimum dose reduced by 25%) and 150 Kg/ha (which represents an optimum dose reduced by 50%).

The following Table 1 shows data related to the above mentioned test, which have been calculated as a dry weight of the maize ear, in waxy milky ripening conditions, with respect to a non manured sample.

TABLE 1

Maize manuring test Effect of the interaction "manured type for nitrogen doses" Dry weight of the maize ear, in grams

| | NYTROGEN DOSES | | | |
|---|---|---|---|---|
| Manure form | 0 Kg/ha | 50 Kg/ha | 225 Kg/ha | 300 Kg/ha |
| UREA | / | 153.0 | 167.3 | 176.2 |
| FLORANID (IBDU) | / | 165.4 | 177.6 | 180.0 |
| SADEPAN 39.0.0 Granular | / | 163.2 | 187.7 | 198.8 |
| Non Manured SAMPLE | 135.5 | / | / | / |

It should be apparent that the best results have been obtained by 39-0-0 at 225 and 300 Kg/ha; at a small dose, the results can be compared, with the exception of that related to urea.

A second test has been performed to study the nutritional effect on sugar beets of the granule form UF fertilizer, once fully applied in seeding the culture, compared with a program based on Urea and Ammonium Nitrate, distributed by two distributing operations, i.e.: in a pre-seeding operation, and a portion at the 6-leaf stage of the sugar beets.

The distributed-nitrogen amounts are included in a 40 to 160 Kg/ha nitrogen.

TABLE 2

Effect of the manuring method on the a-N contents

| Manuring method | a-N Contents Meg/100 g Pulp | |
|---|---|---|
| UREA + AMM.NITR. | 1.49 | b |
| SADEPAN 39.0.0 granular | 1.16 | a |
| D.M.S. (P 0.05) | 0.24 | |

"D.M.S. (P 0.05)" means "a minimum difference significative in 95% of cases".

The results of Table 2 show that the inventive fertilizer always provided, independently from its application dose, a nitrogen contents so-called "noxious" (i.e. an alpha-amine nitrogen present in extraction juices inhibiting crystalization of sugar) less than that obtained according to the manuring program based on conventional fertilizers.

TABLE 3

Effects of the manuring method and nitrogen dose on the "alcalinity coefficient" of the juices.

| Manuring method | Nitrogen Dose (Kg/ha) 0 | 40 | 80 | 120 | 160 |
|---|---|---|---|---|---|
| Urea + Amm.Nitr. | | 5.62 b | 5.53 b | 3.92 c | 3.93 c |
| Non manured sample | 6.25 a | | | | |
| SADEPAN 39.0.0 Granular | | 6.55 ab | 6.75 ab | 5.51 b | 7.77 a |

D.M.S (P 0.05) 1.54

Table 3 shows data related to the technologic processing parameters of juices in the sugar making system: the so-called alcalinity coefficient.

Juices having a high alcalinity coefficient are very useful, since, an alcalinity coefficient of low values, would involve a greater consume of crystalizing reagents (soda, limestone), and a great wear of the concentrating devices.

By using conventional manures, the alcalinity coefficient tends to lower as the applied nitrogen dose increases, whereas, by using the granule form UF fertilizer according to the present invention, this does not occur.

With respect to conventional urea based fertilizers available on the agricultural market, the granule fertilizer according to the present invention, is characterized in that it comprises a coherent "slowly released" nitrogen fraction.

Thus, due to this characteristic, better agronomic performance of this nutritional agent are obtained, as it would actually be necessary for a balanced plant growth, with a consequent less consume of the granule compound, the agricultural yield being the same, and with a consequent smaller loss due to bleaching and percolation from soil (a better environmental impact, and a less or no contamination of the water table).

Laboratory and field tests have demonstrated and assured a less consume of nitrogen, the agricultural yield being the same, and a great power saving, due to a less number of passages of the distributing mechanical equipment through the soil.

From the above mentioned data, it should be pointed out that the, granule UF form as claimed in the present application, is that offering the best agronomic yield.

EXAMPLES

The following examples are herein shown in order to illustrate the invention without limiting it.

The rough materials and chemical products used therein are as follows:

Formaldehyde 43: an aqueous solution at 43% by weight of formaldehyde.

Formurea 70: a urea-formaldehyde precondensate having a molar ratio, expressed as urea: formaldehyde, generally from 1:5.7 and 1:6.3 and a theoretical dry residue, expressed as a percentual sum of urea and formaldehyde, generally from 69 to 71.

It is constituted by formaldehyde (~53%) and urea (~17%).

Formurea 80: a urea-formaldehyde precondensate. Having a molar ratio of 1:4.95 and a theoretical dry residue of 80.

It is constituted by formaldehyde (57%) and urea (23%).

Urea in pearl or pellet form: an industrial use urea.

Water: deironed water, preferably also softened or sweetened.

Catalyzers: sulphuric acid at 10%, sulphamic acid 50%, ammonium nitrate 50%, ammonium sulphate 30%, ammonium chloride 20%, monoammonium phosphate 25%, ammonium acetate 33%, formic acid 20%, hydrochloric acid 17%, nitric acid 30%, phosphoric acid 55%, acetic acid 55% and ammonium formate 30%.

Alkalinizing agents: sodium hydroxide 30%, potassium hydroxide 25%, triethanolamine 50%, monoethanolamine 50%, diethanolamine 50%, ammonia 20÷50%, sodium and potassium carbonates, solid hesamethylentetramine or 40% hesamethylentetramine solution, calcium hydroxide, magnesium hydroxide, sodium tetraborate.

Hereinbelow are listed nutritional element containing chemical products, which can be identified as macro, meso, and microelements, which can be added to the liquid-form UF compound:

Hydrated Sodium Octoborate or hydrated Sodium Tetraborate or Boron (ethanolamina) as sources of Boron.

Zinc Oxide or Zinc Sulphate or Zinc—EDTA as sources of Zinc.

Iron Sulphate or Iron—EDTA or Iron—EDDHA or Iron—EDDHSA or Iron DTPA as sources of Iron (II).

Manganese Sulphate or Manganese—EDTA as sources of Manganese.

Copper Sulphate or Copper Chloride or Copper Oxide or Copper—EDTA as sources of Copper.

Ammonium Molybdate, Sodium or Potassium Molybdate, as sources of Molybdene.

Magnesium Sulphate or Magnesium Hydroxide, or Magnesium Nitrate or Magnesium Chloride as sources of Magnesium.

Calcium Nitrate or Calcium Chloride or Calcium Sulphate as sources of Calcium.

Magnesium Sulphate or Manganese or Potassium Sulphate or Iron or Zinc or Calcium Sulphate as sources of Sulphur-SO.

Potassium sulphate or Potassium Chloride or Potassium Nitrate or Monopotassium Phosphate or Di-potassium Phosphate as sources of Potassium.

Monopotassium Phosphate or Di-potassium Phosphate or Phosphoric Acid or Polyphosphoric Acids or Ammonium Polyphosphate as sources of Phosphate.

Ammonium Nitrate or Sodium Nitrate or Potassium Nitrate or Magnesium Nitrate or Calcium Nitrate as sources of Nitric Nitrogen (in such amounts to provide Applicant's product with a nitric nitrogen content of less than 10% by weight, in particular from 2 to 5% by weight).

Ammonium Nitrate or Ammonium Sulphate or Ammonium Phosphate or Ammoniun Sulphonitrate as sources of Ammoniacal Nitrogen (in such amounts to provide Applicant's products with an ammoniacal nitrogen contents less than 15% by weight, in particular from 3 to 8% weight).

The hereinbelow disclosed Examples, indicated by odd numbers 1, 3, 5, 7, 9, 11, 13, 15, 17, 19, will disclose e preparing of liquid form UF resin and are all related to 1000 Kg of finished product.

For each of the above mentioned examples, an Example of the disclosure of the consequently made granular form UF product will follow:

The latter have been indicated by even numbers from 2 to 20.

Example No. 1

Preparing the Liquid form UF Resin

Into a steel reactor having a size variable from 10,000 to 60,000 litres, including a stirring system and a heating and cooling system, are loaded, under stirring and at atmospheric pressure and room temperature, the following rough materials.

| | |
|---|---|
| 80% Formurea | Kg 350.9 |
| Water | Kg 49.8 |
| Urea | Kg 79.3 |

(molar ratio $CH_4N_2O/CH_2O$=1/2.5).

The mixture is heated to 90° C., and 0.5 Kg 20% Formic Acid are added to provide a pH from 5.0 to 5.5.

The reaction, as monitored at even time periods by dynamic viscosity measurements at 20° C., is stopped at 1,500 mPas, by adding 0.5 Kg 30% Soda.

After stopping the reaction, neutrality is achieved.

There are moreover loaded:

106.7 Kg Urea (molar ratio $CH_4N_2O/CH_2O$=1/1.5), with temperature being held at 70° C. for 30 minutes.

There are then added:

145.7 Kg Water 266.6 Kg Urea (end molar ratio $CH_4N_2O/CH_2O$=1/0.75).

The mixture is held at 45° C. for 60 minutes, then it is cooled and supplied to the storing tank.

The finished product contains 24.8% in total of nitrogen.

Example No. 2

UF Resin Granulating Test

The liquid material of Example 1 (having a pH=7.5÷8.0 and a viscosity at 20° C.=350÷400 mPas) is supplied to a 100 liter mixer held under constant stirring and heated to 50÷60° C., thereby lowering the viscosity to 60÷80 mPas.

By a displacement type of pump, the mixture is then supplied to the granulating device; a static mixer arranged on the pumping line provides a mixing with the catalyzer (Ammonium Sulphate at 30%, in a rate of 1.66% by weight on the liquid material): this causes a lowering of the mixture pH to 5.6÷5.8.

At the outlet of the granulating device, the granules are conveyed through a two-net sieve: the fraction from 2.0 to 4.0 mm constituting the finished product.

Characteristics of the finished product:

| | |
|---|---|
| Shape | White spherical granules; |
| Granulometry | 20.0 ÷ 2.5 mm; |
| Total Nitrogen | 38.0% minimum; |
| Hot water soluble nitrogen | 23% minimum; |
| Granule hardness | 1.5 ÷ 2.0 Kg; |
| Friability | 1% maximum; |
| End moisture | 1.5 maximum; |
| Apparent density | ~0.75 g/cm; |
| Activity index | 20 ÷ 25%; |
| Ureic nitrogen | 4% maximum; |
| Heating packing | it is not packed after 1 month at 70° C. in a thermostatized stove; |
| Compression packing | it is not packed after 1 Month under a load of 200 g/sm. |

Example 3

Preparing the Liquid form UP Resin

Into a steel reactor having a size variable from 10,000 to 60,000 including a stirring system and a heating and cooling system, are loaded, under stirring, at atmospheric pressure and room temperature, the following raw materials.

| | |
|---|---|
| Formurea 70% | Kg 434.0 |
| Water | Kg 76.2 |
| Urea | Kg 79.5 |

(molar ratio $CH_4N_2O/CH_2O$=1/3.0).

The mixture is heated to 95° C. and 0.4 Kg 30% Ammonium Sulphate are added: the pH is lowered to 5.5÷6.0.

The mixture is held at 95° C. for 30 minutes, without controlling its viscosity.

The reaction is partially stopped by adding 0.1 Kg 20% Sodium Carbonate.

After this adding step, the pH achieves a value of 6.0÷6.2 and the reaction is continued by adding:

76.7 Kg urea (molar ratio $CH_4N_2O/CH_2O$=1/2.0).

The temperature falls to 80° C., but it must be recovered to 95° C.: in this step the reaction is stopped as its viscosity achieves 1,200 mPas.

A full stopping of the reaction is made by adding 0.2 Kg 30% Soda.

After stopping the reaction, the pH of the mixture is near to neutrality.

Then are loaded:

82.8 Kg Water 247.7 Kg Urea (and molar ratio $CH_4N_2O/CH_2O$=1/0.96)

2.4 Kg hydrated Sodium Octoborate

The mixture is at 40° C. for 60 minutes, then it is cooled and supplied to the storing tank.

The finished product contains in total 22.3% Nitrogen and 0.05 Boron.

Example No. 4

UF Resin Granulating Test

The liquid of Example 3 (having a pH 8.5÷9.0 and a viscosity at 20=550÷650 mPas) together with a water soluble yellow coloring or dyeing material (few ppm's are sufficient) is conveyed to a 100 liter mixer, held under constant stirring and heated to 55÷65° C., thereby causing its viscosity to be lowered to 80÷100 mPas.

By a displacement pump, the mixture is then supplied to the granulating device; a static mixer arranged on the pumping line assure its mixing with the catalyzer (20% Formic Acid in a rate of 2.5% by weight on the liquid amount) and the pH of the mixture is lowered to 5.8÷6.0.

At the outlet of the granulating device, the granules are conveyed through a two-net sieve: the fraction from 1.5 to 3.0 mm forms the finished product.

Characteristics of the finished product:

| | |
|---|---|
| Shape | Yellow spherical granules; |
| Granulometry | 1.5 ÷ 2.0 mm; |
| Total Nitrogen | 36.0% minimum; |
| Microelements | 0.06% Boron |

-continued

| | |
|---|---|
| Hot water soluble nitrogen | 22% minimum; |
| Granule hardness | 1.0 ÷ 1.5 Kg; |
| Friability | 1% maximum; |
| End moisture | 2.0 maximum; |
| Apparent density | ~0.75 g/cm$^3$; |
| Activity index | 30 ÷ 35%; |
| Ureic nitrogen | 3% maximum; |
| Packing by heating: | it is not packed after 1 month at 70° C. in a thermo-statized stove; |
| Compression packing | it is not packed after 1 month under a load of 200 g/cm$^2$. |

Example 5

Preparing the Liquid form UF Resin

Into a steel reactor having a size variable from 10,000 to 60,000 liters including a stirring system and a heating and cooling system, are loaded, under stirring, at atmospheric pressure and room temperature, the following raw materials:

| | |
|---|---|
| 43% Formaldehyde | Kg 418.6 |
| 30% Soda | Kg 0.25 |
| Urea | Kg 180.0 |

(molar ratio $CH_4N_2O/CH_2O$ = 1/2.0).

The mixture is heated to 100° C. and 0.6 Kg 20% Formic Acid are added, to cause the pH to be lowered to 4.5÷4.8.

The reaction, monitored at even time periods by dynamic viscosity measurements at 20° C., is stopped by adding 0.6 Kg 30% Soda, as a viscosity of 150 mPas is achieved.

After stopping the reaction, the neutrality is achieved.

Then are loaded:

4.15 Kg Water 120.0 Kg Urea (molar ratio $CH_4N_2O/CH_2O$=1/1.2) and the temperature is held at 60° C. for 40 minutes, and then are added:

253.8 Kg Urea (end molar ratio $CH_4N_2O/CH_2O$=1/0.65)

22.0 Kg Zinc-EDTA.

The mixture is held at 60° C. for 60 minutes, then it is cooled and supplied to the storing tank.

The finished product contains 25.8% in total nitrogen and 0.4% Zinc.

Example No. 6

UF Resin Granulating Test

The liquid of Example 5 (having a pH=7.0 and a viscosity at 20° C.=850÷950 mPas), together with a water soluble sky-blue coloring material (few ppm's are sufficient) are supplied to a 100 liter mixer, held under a constant stirring and heated to 50÷60° C., thereby causing the mixture viscosity to be lowered to 130÷150 mPas.

By a displacement type of pump, the mixture is supplied to the granulating device; a static mixer arranged on the pumping line provides a mixing with the catalyzer (20% Formic Acid in a rate of 1.5% by weight based on the liquid) and the pH of the mixture is lowered to 5.8÷6.0.

At the outlet of the granulating device, the granules are conveyed through a two-net sieve: the fraction from 2.0 to 4.0 mm constitutes the finished product.

Characteristics of the finished product:

| | |
|---|---|
| Shape | Sky-blue spherical granules; |
| Granulometry | 20.0 ÷ 2.5 mm; |
| Total Nitrogen | 39.0% minimum; |
| Microelements | 0.6% Zinc |
| Hot water soluble nitrogen | 26% minimum; |
| Granule hardness | 2.5 ÷ 3.0 Kg; |
| Friability | 0.5% maximum; |
| End moisture | 1% maximum; |
| Apparent density | ~0.80 g/cm; |
| Activity index | 40 ÷ 45%; |
| Ureic nitrogen | 5% maximum; |
| Packing by heating | it is not packed after 1 month at 70° C. in a thermo-statized stove; |
| Compression packing | it is not packed after 1 Month under a load of 200 g/cm$^2$. |

Example 7

Preparing the Liquid form UF Resin

Into a steel reactor having a size variable from 10,000 to 60,000 liters, including a stirring system and a heating and cooling system, are loaded, under stirring, at atmospheric pressure and room temperature, the following raw materials:

| | |
|---|---|
| 70% Formurea | Kg 434.0 |
| Water | Kg 47.2 |
| Urea | Kg 110.2 |

(molar ratio $CH_4N_2O/CH_2O$ = 1/2.5).

The mixture is heated to 90° C. and 0.4 Kg 20% formic acid are added to lower the mixture pH to 5.0÷5.4.

The reaction is partially stopped by adding 0.1 Kg 20% sodium carbonate as the mixture viscosity achieves a value of 50 mPas.

After this step, the pH increases again to 6.0÷6.2 and the reaction is continued by loading: 58.1 Kg Urea (molar ratio $CH_4N_2O/CH_2O$=/1.9).

The temperature must be brought again to 90° C. and then 0.6 Kg 30% Ammonium Sulphate are added to cause the pH to again lower to 5.3÷5.7.

The reaction is monitored as the viscosity of said mixture achieves a value of 1,000 mPas (stopping viscosity).

The stopping is achieved by adding 0.6 Kg 30% Soda, thereby bringing the mixture to neutrality.

Then are loaded:

15.9 Kg Water 176.1 Kg Urea (molar ratio $CH_4N_2O/CH_2O$=1/1.1) and the mixture is held at 60° C. for 40 minutes.

Then are added:

156.8 Kg Urea (end molar ratio $CH_4N_2O/CH_2O$=1/0.8).

The mixture is held at 60° C. for 40 minutes, it is then cooled and supplied to the storing tank.

The finished product contains in total 26.8% Nitrogen

Example No. 8

UF Resin Granulating Test

The liquid of Example 7 (having a pH=7.5÷8.0 and a viscosity at 20° C.=250÷300 mPas) is conveyed to a 100 liter mixer and held under constant stirring and heated to 40÷50° C., thereby causing its viscosity to be lowered to 60÷70 mPas.

By a volumetric pump, the mixture is then supplied to the granulating device; a static mixer arranged on the pumping line provides mixing with the catalyzer (30% Ammonium Sulphate corresponding to 1.33% by weight based on the liquid material) and the mixture pH lowers to 5.6÷5.8.

At the outlet of the granulating device, the granules pass through a two-net sieve: the finished product being constituted by the fraction from 2.5 to 4.5 mm.

The finished product, as made, has the following characteristics:

| | |
|---|---|
| Shape | White spherical granules; |
| Granulometry | 2.5 ÷ 3.0 mm; |
| Total Nitrogen | 39.0% minimum; |
| Hot water soluble nitrogen | 30% minimum; |
| Granule hardness | 3.0 ÷ 3.5 Kg; |
| Friability | 0.5% maximum; |
| End moisture | 1% maximum; |
| Apparent density | ~0.65 g/cm$^3$; |
| Activity index | 55 ÷ 60%; |
| Ureic nitrogen | 5% maximum; |
| Packing by heating: | it is not packed after 1 month at 70° C. in a thermostatized stove; |
| Compression packing | it is not packed after 1 month under a load of 200 g/cm$^2$. |

Example No. 9

Preparing the Liquid form UP Resin

Into a steel reactor having a size variable from 10,000 to 60,000 liters, including a stirring system and a heating and cooling system, are loaded, under stirring and at atmospheric pressure and room temperature, the following raw materials:

| | |
|---|---|
| 80% Formurea | Kg 386.0 |
| Water | Kg 17.1 |
| Urea | Kg 68.4 |

(molar ratio $CH_4N_2O/CH_2O$ = 1/2.8).

The mixture is heated to 85° C. and 0.2 Kg 50% Sulphamic Acid are added, to lower the pH to 4.8÷5.2.

The reaction is stopped by adding 0.3 Kg 30% Soda as a viscosity of 1,000 mPas is achieved, the pH assuming a stable value of 6.8÷7.0.

The reaction is continued by adding:

62.8 Kg Urea (molar ratio $CH_4N_2O/CH_2O$=1/2.0).

The temperature is brought again to 90° C., and then 0.3 Kg 30% Ammonium Sulphate are added, thereby the pH returns to 5.7÷6.0.

The reaction is locked at a viscosity of 1,600 mPas by adding 0.3 Kg 30% Soda.

After stopping the reaction, neutrality conditions are achieved.

Then are loaded:

7.8 Kg Water 220.0 Kg Urea (molar ratio $CH_4N_2O/CH_2O$=1/1.0) and the mixture is held at 60° C. for 60 minutes, and then are further added:

48.0 Kg Urea (end molar ratio $CH_4N_2O/CH_2O$=1/0.9).

The mixture is held at 40° C. for 30 minutes, then it is cooled and 187.9 Kg hydraded Magnesium Sulphate are further added.

The end or finished product contains 22.8% nitrogen in total and 2% Magnesium in total.

Example No. 10

UF Resin Granulating Test

The liquid of Example 9 (having a pH 7.0÷7.5 and a viscosity at 20° C. 800÷1,000 mPas), together with a water soluble blue dyeing or coloring material (few ppm's would be sufficient) is conveyed to a 100 liter mixer, held under constant stirring and heated to 60÷70° C., thereby lowering the mixture viscosity to 110÷130 mPas.

By a volumetric pump, the mixture is then supplied to the granulating device; a static mixer arranged on the pumping line provides mixing with the catalyzer (55% Phosphoric Acid in a rate of 0.73% by weight based on the liquid as such) and the pH of the mixture lowers to 6.0÷6.3.

At the outlet of the granulating device, the granules are conveyed through a two-net sieve: the fraction from 2.5 to 4.5 mm constituting the end or finished product.

The finished or end product characteristics are as stated thereinbelow:

| | |
|---|---|
| Shape | Blue spherical granules; |
| Granulometry | 2.5 ÷ 3.0 mm; |
| Total Nitrogen | 32.0% minimum; |
| Mesoelements | 28% Manganese |
| Hot water soluble nitrogen | 22% minimum; |
| Granule hardness | 2.0 ÷ 2.5 Kg; |
| Friability | 1% maximum; |
| End moisture | 2.0% maximum; |
| Apparent density | ~0.80 g/cm$^3$; |
| Activity index | 40 ÷ 45%; |
| Ureic nitrogen | 2% maximum; |
| Packing by heating: | it is not packed after 1 month at 70° C. in a thermostatized stove; |
| Compression packing | it is not packed after 1 month under a load of 200 g/cm$^2$. |

Example No. 11

Preparing the Liquid form UF Resin

Into a steel reactor having a size variable from 10,000 to 60,000 liters, including a stirring system and a heating and cooling system, there are loaded, under stirring, at atmospheric pressure and room temperature, the following raw materials:

| | |
|---|---|
| 80% Formurea | Kg 438.6 |
| Water | Kg 47.7 |
| Urea | Kg 55.4 |

(molar ratio $CH_4N_2O/CH_2O$ = 1/3.2).

The mixture is heated to 80° C. and 0.2 Kg 55% Phosphoric Acid are further added to lower the pH to 4.0÷4.4.

The reaction is stopped at a viscosity of 800 mPas by adding 0.3 Kg 24% Ammonia: the pH is brought to 6.0÷6.2 and the reaction is continued by loading:

43.7 Kg Urea (molar ratio $CH_4N_2O/CH_2O$=1/2.5).

The mixture temperature is brought again to 90° C.; and the reaction is stopped as the viscosity achieves, during this step, a value of 500 mPas.

The reaction is fully stopped by adding 0.2 Kg 30% Soda, to provide neutrality conditions.

Then are loaded:

58.2 Kg Water 133.3 Kg Urea (molar ratio $CH_4N_2O/CH_2O$=1/1.5) and the temperature of the mixture is brought again to 100° C.

Then 0.1 Kg 30% Ammonium Sulphate are further added to bring the pH to 6.0÷6.3.

The reaction is continued for other 20 minutes before stopping it by adding 0.1 Kg 30% Soda.

Then are added:

222.2 Kg Urea (end molar ratio $CH_4N_2O/CH_2O$=1/0.9).

The mixture is held at 60° C. for 60 minutes, then it is cooled and supplied to a storing tank.

The obtained product contains 25.9% Nitrogen.

Example No. 12

UF Resin Granulating Test

The liquid of Example 11 (having a pH=7.0÷7.5 and a viscosity at 20° C.=400÷500 mPas), is supplied to a 100 liter mixer, held under constant stirring and heated to 50÷60° C., thereby lowering the viscosity thereof to 70÷90 mPas.

By a volumetric or displacement pump, the mixture is then supplied to the granulating device; a static mixer arranged on the pumping line provides mixing with the catalyzer (30% Ammonium Sulphate in a rate of 1.66% by weight based on the liquid as such) and the pH of the mixture lowers to 5.6÷5.8.

At the outlet of the granulating device, the granules are conveyed through a two-net sieve: the finished or end product comprising the fraction from 2.0 to 4.0 mm.

The end or finished product has the following characteristics:

| | |
|---|---|
| Shape | White spherical granules; |
| Granulometry | 2.0 ÷ 2.5 mm; |
| Total Nitrogen | 38.0% minimum; |
| Hot water soluble nitrogen | 27.5% minimum; |
| Granule hardness | 2.0 ÷ 2.5 Kg; |
| Friability | 1% maximum; |
| End moisture | 1% maximum; |
| Apparent density | ~0.75 g/cm$^3$; |
| Activity index | 47 ÷ 53%; |
| Ureic nitrogen | 4% maximum; |
| Packing by heating: | it is not packed after 1 month at 70° C. in a thermostatized stove; |
| Compression packing | it is not packed after 1 month under a load of 200 g/cm$^2$. |

Example No. 13

Preparing the Liquid form UF Resin

Into a steel reactor having a size variable from 10,000 to 60,000 liters, including a stirring system and a heating and cooling system, there are loaded, under stirring, at atmospheric pressure and room temperature, the following raw materials:

| | |
|---|---|
| 70% Formurea | Kg 377.4 |
| Water | Kg 16.4 |
| Urea | Kg 69.2 |

(molar ratio $CH_4N_2O/CH_2O$ = 1/3.0).

The mixture is heated to 95° C. and 0.6 Kg 30% Ammonium Sulphate are further added to lower the pH to 5.0÷5.5.

The reaction is stopped at a viscosity of 500 mPas by adding 0.4 Kg 24% Ammonia: the pH being brought to 5.8÷6.2.

The reaction is continued by loading:

48.5 Kg Urea (molar ratio $CH_4N_2O/CH_2O$=1/2.2).

The temperature of the mixture is brought again to 90° C., and the reaction is stopped at a viscosity of 1,200 mPas.

A full stopping of the reaction is achieved by adding 0.5 Kg 30% Soda.

After stopping the reaction, neutrality conditions are achieved.

Then are further loaded:

115.3 Kg Water 103.8 Kg Urea (molar ratio $CH_4N_2O/CH_2O$=1/1.4), the mixture being held at 50° C. for 50 minutes, and then are further added:

247.6 Kg Urea (end molar ratio $CH_4N_2O/CH_2O$=1/0.75)

20.3 Kg hydrated Manganese Sulphate.

The mixture is-brought again to a temperature of 40° C. for 40 minutes and then is cooled and supplied to the storing tank.

The end or finished product contains 24.8% Nitrogen in total and 0.5% Magnese.

Example No. 14

UF Resin Granulating Test

The liquid of Example 13 (having a pH 7.0 and a viscosity at 20° C.=250÷350 mPas), together with a water soluble violet dyeing material (few ppm's would be sufficient) is conveyed to a 100 liter mixer, held under constant stirring and heated to 40÷50° C., thereby lowering the mixture viscosity to 60÷70 mPas.

By a volumetric pump, the mixture is then supplied to the granulating device; a static mixer arranged on the pumping line provides mixing with the catalyzer (30% Ammonium Sulphate in a rate of 1.0% by weight based on the liquid material as such) and the pH of the mixture lowers to 6.2÷6.4.

At the outlet of the granulating device, the granules pass through a two-net sieve: the fraction from 2.0 to 4.0 mm constituting the end or finished product.

The end or finished product, as made, has the following characteristics:

| | |
|---|---|
| Shape | Violet spherical granules; |
| Granulometry | 2.0 ÷ 2.5 mm; |
| Total Nitrogen | 38.0% minimum; |
| Microelements | 0.75% Manganese |
| Hot water soluble nitrogen | 32% minimum; |
| Granule hardness | 2.0 ÷ 2.5 Kg; |
| Friability | 1% maximum; |
| End moisture | 2.0% maximum; |
| Apparent density | ~0.80 g/cm$^3$; |
| Activity index | 75 ÷ 80%; |
| Ureic nitrogen | 5% maximum; |
| Packing by heating: | it is not packed after 1 month at 70° C. in a thermostatized stove; |
| Compression packing | it is not packed after 1 month under a load of 200 g/cm$^2$. |

Example No. 15

Preparing the Liquid form UF Resin

Into a steel reactor having a size variable from 10,000 to 60,000 liters, including a stirring system and a heating and cooling system, there are loaded, under stirring, at atmospheric pressure and room temperature, the following raw materials:

| | |
|---|---|
| 43% Formaldehyde | Kg 372.0 |
| Soda | Kg 0.2 |
| Urea | Kg 125.0 |

(molar ratio $CH_4N_2O/CH_2O$ = 1/2.5).

The mixture is heated to 100° C. and 0.4 Kg 20% Formic Acid are further added to lower the pH of the mixture to 4.8÷5.2.

The temperature of the mixture is held at 100° C. for 50 minutes.

The reaction is then stopped by adding 0.5 Kg 20% Sodium Carbonate.

After stopping the reaction, neutrality conditions are achieved.

Then there are further loaded:

88.3 Kg Urea (molar ratio $CH_4N_2O/CH_2O$=1/1.5) and the temperature is held at 75° C. for 30 minutes.

Then are further added:

43.6 Kg Water 320.0 Kg Urea (end molar ratio $CH_4N_2O/CH_2O$=1/0.6).

The temperature of the mixture is held 40° C. for 60 minutes, and then the mixture is cooled and are further added:

50.0 Kg (II) Iron-EDTA

The end product contains 24.8% total Nitrogen and 0.8% Iron.

Example No. 16

UF Resin Granulating Test

The liquid of Example 15 (having a pH=6.5÷7.0 and a viscosity at 20° C.=250÷350 mPas), together with a water soluble brown dyeing or coloring material (few ppm's would be sufficient) is conveyed to a 100 liter mixer, held under constant stirring and heated to 40÷50° C. to lower its viscosity to 60÷80 mPas.

By a volumetric pump, the mixture is then supplied to the granulating device; a static mixer arranged on the pumping line provides mixing with the catalyzer (20% Formic Acid at a rate of 1.5% by weight based on the liquid material as such) and the pH of the mixture lowers to 5.6÷5.8.

At the outlet of the granulating device, the granules are conveyed through a two-net sieve: the finished or end product comprising the fraction from 1.5 to 3.5 mm.

The finished or end product has the following characteristics:

| | |
|---|---|
| Shape | Brown spherical granules; |
| Granulometry | 1.5 ÷ 2.5 mm; |
| Total Nitrogen | 38.0% minimum; |
| Microelements | 1.2% Iron; |
| Hot water soluble nitrogen | 28% minimum; |
| Granule hardness | 2.5 ÷ 3.5 Kg; |
| Friability | 0.5% maximum; |
| End moisture | 2.0% maximum; |
| Apparent density | ~0.85 g/cm$^3$; |
| Activity index | 52 ÷ 58%; |
| Ureic nitrogen | 5% maximum; |
| Packing by heating: | it is not packed after 1 month at 70° C. in a thermostatized stove; |
| Compression packing | it is not packed after 1 month under a load of 200 g/cm$^2$. |

Example No. 17

Preparing the Liquid form UF Resin

Into a steel reactor having a size variable from 10,000 to 60,000 liters, including a stirring system and a heating and cooling system, there are loaded, under stirring, at atmospheric pressure and room temperature, the following raw materials:

| | |
|---|---|
| 70% Formurea | Kg 283.0 |
| Water | Kg 69.3 |
| Urea | Kg 88.2 |

(molar ratio $CH_4N_2O/CH_2O$ = 1/2.2).

The mixture is heated to 90° C. and 0.2 Kg 55% Phosphoric Acid are further added to lower the pH of the mixture to 4.3÷4.8.

The reaction is locked by adding 0.4 Kg 24% Ammonia as the viscosity of the mixture achieves a value of 200 mPas at 20° C.

After stopping the reaction, neutrality conditions are achieved.

Then are further loaded:

94.4 Kg Urea (molar ratio $CH_4N_2O/CH_2O$=1/1.3) and the temperature of the mixture is held at 70° C. for 30 minutes.

Then are further added:

195.3 Kg Water 169.2 Kg Urea (end molar ratio $CH_4N_2O/CH_2O$=1/0.75).

The temperature of the mixture is held at 40° C. for 30 minutes, and then the mixture is cooled and being further added:

50.0 Kg Monopotassium Phosphate and 50.0 Kg Di-Potassium Phosphate.

The end or finished product contains 18.6% Nitrogen in total, 5% $P_2O_5$ and 7.5% $K_2O$.

Example No. 18

UF Resin Granulating Test

The liquid of Example 17 (having a neutral pH and a viscosity at 20° C.=1,000÷1,200 mPas), together with a water soluble red dyeing or coloring material (few ppm's would be sufficient) is conveyed to a 100 liter mixer, held under constant stirring and heated to 60÷70° C., to lower its viscosity to 120÷150 mPas.

By a volumetric or displacement pump, the mixture is then supplied to the granulating device; a static mixer arranged on the pumping line provides mixing with the catalyzer (55% Phosphoric Acid at a rate of 1.82% by weight based on the liquid material as such) and the pH of the mixture is lowered 6.5÷6.7.

At the outlet of the granulating device, the granules are conveyed through a two-net sieve: the end product comprising the fraction from 3.0 to 5.0 mm The end or finished product has the following characteristics:

| | |
|---|---|
| Shape | Red spherical granules; |
| Granulometry | 3.0 ÷ 3.5 mm; |
| Total Nitrogen | 30.0% minimum; |
| Macroelements | 8.0% $P_2O_5$ and 12.0% $K_2O$; |
| Hot water soluble nitrogen | 20% minimum; |
| Granule hardness | 1.5 ÷ 2.5 Kg; |
| Friability | 1% maximum; |
| End moisture | 2.0% maximum; |
| Apparent density | ~0.65 g/cm$^3$; |
| Activity index | 40 ÷ 45%; |
| Ureic nitrogen | 1% maximum; |
| Packing by heating: | it is not packed after 1 month at 70° C. in a thermostatized stove; |
| Compression packing | it is not packed after 1 month under a load of 200 g/cm$^2$. |

Example No. 19

Preparing the Liquid form UF Resin

Into a steel reactor having a size variable from 10,000 to 60,000 liters, including a stirring system and a heating and cooling system, there are loaded, under stirring, at atmospheric pressure and room temperature, the following raw materials:

| | |
|---|---|
| 43% Formaldehyde | Kg 325.0 |
| Soda | Kg 0.15 |
| Urea | Kg 140.0 |

(molar ratio $CH_4N_2O/CH_2O$ = 1/2.0).

The mixture is heated to 98° C. and 0.2 Kg 55% Phosphoric Acid are further added to lower the pH of the mixture to 4.0÷4.5.

The reaction is topped by adding 0.4 Kg 24% Ammonia as the viscosity of the mixture achieves a value of 120 mPas at 20° C.

After stopping the reaction, neutrality conditions are achieved.

Then are further loaded:

93.3 Kg Urea (molar ratio $CH_4N_2O/CH_2O$=1/1.2) and the mixture is held at 75° C. for 30 minutes.

Then are further added:

180.65 Kg Water 166.7 Kg Urea (end molar ratio $CH_4N_2O/CH_2O$=1/0.7).

The temperature of the mixture is held at 40° C. for 30 minutes, and then the mixture is cooled and being further added:

93.0 Kg Potassium Sulphate.

The end or finished product contains 18.6% Nitrogen in total and 5% $K_2O$.

Example No. 20

UF Resin Granulating Test

The liquid of Example 19 (having a pH=7.0÷7.5 and a viscosity at 20° C.=950÷1,050 mPas), together with a water soluble green dyeing or coloring material (few ppm's would be sufficient) is conveyed to a 100 liter mixer, held under constant stirring and heated to 60÷70° C., thereby lowering the mixture viscosity to 120÷140 mPas.

By a volumetric or displacement pump, the mixture is then supplied to the granulating device; a static mixer arranged on the pumping line provides mixing with the catalyzer (55% Phosphoric Acid in a rate of 1.45% by weight based on the liquid material as such) and the pH of the mixture lowers to 6.0÷6.2.

At the outlet of the granulating device, the granules are conveyed through a two-net sieve: the finished or end product comprising the fraction from 3.0 to 5.0 mm.

The end or finished product, as made, has the following characteristics:

| | |
|---|---|
| Shape | Green spherical granules; |
| Granulometry | 3.0 ÷ 3.5 mm; |
| Total Nitrogen | 30.0% minimum; |
| Macroelements | 8.0% $K_2O$ |
| Hot water soluble nitrogen | 22% minimum; |
| Granule hardness | 1.5 ÷ 2.5 Kg; |
| Friability | 1% maximum; |
| End moisture | 2.5% maximum; |
| Apparent density | ~0.90 g/cm$^3$; |
| Activity index | 50 ÷ 55%; |
| Ureic nitrogen | 1% maximum; |
| Packing by heating: | it is not packed after 1 month at 70° C. in a thermostatized stove; |
| Compression packing | it is not packed after 1 month under a load of 200 g/cm$^2$. |

From the above disclosure it should be apparent that the invention fully achieves the intended aim and objects.

In particular, the invention provides a method. for making nitrogenous and complex fertilizers, slowly releasing nitrogen, and having a granule form, allowing to make a very homogeneous product and which can accordingly be easily applied by conventional applying means for distributing granule form manures.

The invention has provided a method for making a nitrogenous and complex fertilizer, for slowly releasing nitrogen in granule form, said method comprising the steps of preparing an aqueous urea-formaldehyde mixture, wherein said resin dispersion is prepared by a reaction and a heating and cooling system, at atmospheric pressure and room temperature, formaldehyde, urea and water, with a urea/formaldehyde molar ratio of from 0.8:1 to 2:1, thereby providing said aqueous dispersion, heating and reacting said aqueous dispersion to a temperature from substantially 80° C. to 110° C., controlling pH from 4 to 7, monitoring at even time periods a viscosity of said dispersion and further adding to said aqueous dispersion a reaction stopping agent to achieve, upon stopping said reaction, a substantially pH neutrality condition, supplying the mixture in a liquid form to a storing tank, conveying said mixture from said storing tank to a drying and granulating device for simultaneously reactively drying and granulating said mixture to provide a granulated solid support and spraying on said support said mixture to provide urea/formaldehyde substantially perfectly spherical homogeneous fertilizer granules having a density in a range from 0.5 to 1 g/cm$^3$, preferably from 0.8 to 0.9 g/cm$^3$, a total nitrogen contents form 36 to 42%, preferably from 38 to 40% by weight, an ureic nitrogen contents less than 5% by weight, a nitric nitrogen contents less than 10% by weight, preferably from 2 to 5% by weight, an ammoniacal nitrogen contents less than 15% by weight, preferably from 3 to 8% by weight, and a diameter from 0.5 to 5 mm.

The invention as disclosed is susceptible to several modifications and variations, all of which will come within the inventive idea scope.

Moreover, all the constructional details of the disclosed system can be replaced by other technically equivalent elements.

Furthermore, some products or components used for preparing the inventive fertilizer can be replaced by other technically equivalent elements.

The invention claimed is:

1. A method for making a nitrogenous and complex fertilizer, for slowly releasing nitrogen in granule form, said method comprising the steps of preparing an aqueous urea-formaldehyde resin dispersion or mixture, wherein said resin dispersion is prepared by a reaction and a heating and cooling system, at atmospheric pressure and room temperature, formaldehyde, urea and water, with a formaldehyde/urea first ratio from substantially 0.8:1 to 2:1, thereby providing said aqueous dispersion, heating and reacting said aqueous dispersion to a temperature from substantially 80° C. to 110° C., controlling the pH from 4 to 7, monitoring at even time periods a viscosity of said dispersion and further adding to said aqueous dispersion a reaction stopping agent to achieve, upon stopping said reaction, a substantially pH neutrality condition, supplying the mixture in a liquid form to a storing tank, conveying said mixture from said storing tank to a drying and granulating device for simultaneously reactively drying and granulating said mixture to provide a solid support and spraying on said solid support said mixture to provide urea/formaldehyde substantially perfectly spherical homogenous fertilizer granules having a density in a range from 0.5 to 1 $g/cm^3$, preferably from 0.8 to 0.9 $g/cm^3$, a total nitrogen contents from 36 to 42%, preferably from 38 to 40% by weight, an ureic nitrogen contents less than 5% by weight, a nitric nitrogen content less than 10% by weight, preferably from 2 to 5% by weight, an ammoniacal nitrogen contents less than 15% by weight, preferably from 3 to 8% by weight, and a diameter from 0.5 to 5 mm.

2. A method, according to claim 1, wherein said aqueous urea/formaldehyde dispersion has a molar ration preferably from 1:1 to 1.5:1.

3. A method, according to claim 1, wherein said method comprises an optional step of adding to said aqueous urea/formaldehyde dispersion, a powder urea/formaldehyde resin optionally as a recycle product, having a particle size less than 0.5 mm and water to provide a viscosity from 40 to 200 mPas at a temperature from 40 to 70° C.

4. A method, according to claim 3, wherein said viscosity is from 80 to 120 mPas.

5. A method, according to claim 1, wherein said pH control agent is an aqueous catalyzer solution added to said dispersion with a weight ratio of preferably 0.5 to 2%.

6. A method, according to claim 5, wherein said aqueous catalyzer solution is selected from the following catalyzer solutions: 10% Sulphuric Acid, 50% Suiphamic Acid, 50% Ammonium Nitrate, 30% Ammonium Sulphate, 20% Ammonium Chloride, 25% Mono-Ammonium Phosphate, 33% Ammonium Acetate, 20% Formic Acid, 17% hydrochloric Acid, 30% Nitric Acid, 55% Phosphoric Acid, 30% Ammoniun Formate.

7. A method, according to claim 1, wherein said aqueous dispersion has a pH from 5.0 to 6.0.

8. A method, according to claim 1, wherein said method comprises a further step of adding to said aqueous urea/formaldehyde dispersion, macro and/or meso (S, Ca, Mg) and/or micro-elements.

9. A method, according to claim 1, wherein said method comprises a further step of adding to said aqueous urea/formaldehyde dispersion potassium, in a chloride nitrate or sulphate form, to provide a NK fertilizer with a nitrogen contents larger than or equal to 3% and a potassium contents, expresses as $K_2O$ greater than or equal to 5%.

10. A method, according to claim 1, wherein said method comprises a further step of adding to said aqueous urea/formaldehyde dispersion phosphorus in an alkaline metal, earth-alkaline metal or ammonium phosphate or polyphosphate form or as phosphoric or polyphosphoric acids to provide a NP fertilizer having a nitrogen contents greater than or equal to 30% and phosphorus contents, expressed as $P_2O_3$, greater than or equal to 5%.

11. A method, according to claim 1, wherein said method comprises a further step of adding to said urea/formaldehyde mixture phosphorus in the form of alkaline, earth-alkaline metal or ammonium phosphate or phosphoric acids, and potassium, such as potassium chloride, nitrate, sulphate or phosphate, to provide a NPK fertilizer having nitrogen contents greater than or equal to 3%, phosphorous contents expressed as $P_2O_5$, greater than or equal to 5%, and potassium contents, expressed as $K_2O$, greater than or equal to 5%.

* * * * *

UNITED STATES PATENT AND TRADEMARK OFFICE

CERTIFICATE OF CORRECTION

PATENT NO. : 7,402,190 B2
APPLICATION NO. : 10/229782
DATED : July 22, 2008
INVENTOR(S) : Gianluca Costa It is certified that error appears in the above-identified patent and that said Letters Patent is hereby corrected as shown below:

Title page Item (76) Inventors: Delete Giancarlo Costa
Insert Gianluca Costa

Signed and Sealed this

Eleventh Day of November, 2008

JON W. DUDAS
*Director of the United States Patent and Trademark Office*